May 3, 1949.  S. A. BARSTAD  2,469,026
ARRANGEMENT FOR THE SALTING AND
HOOKING OF FISH (HERRING)
Filed Nov. 7, 1946 2 Sheets-Sheet 1
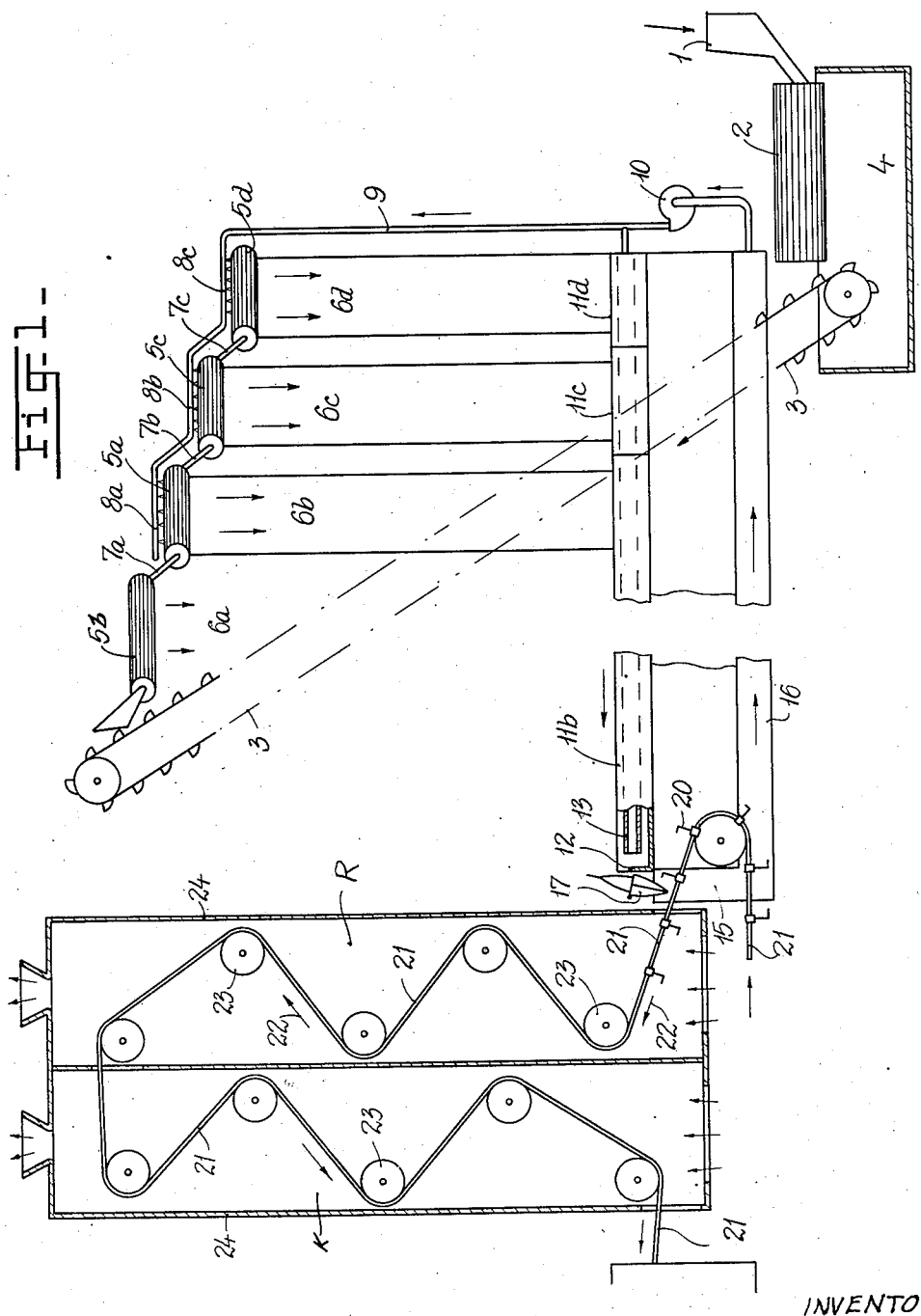
INVENTOR
Sverre A. Barstad
By
ATTORNEY May 3, 1949.
S. A. BARSTAD
ARRANGEMENT FOR THE SALTING AND
HOOKING OF FISH (HERRING)
Filed Nov. 7, 1946
2,469,026
2 Sheets-Sheet 2
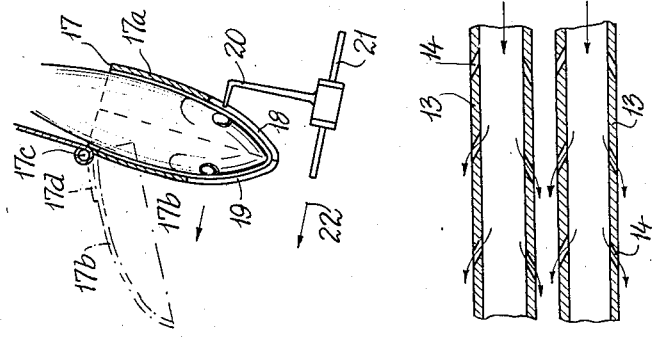
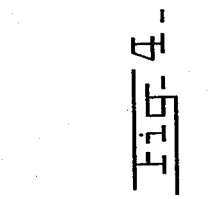
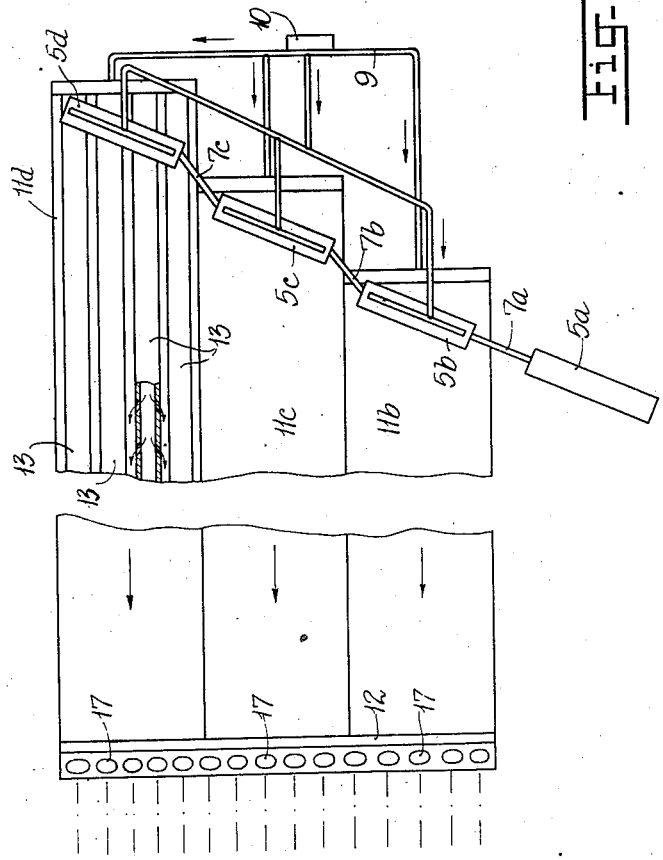
INVENTOR
Sverre A. Barstad
By Robert E. Burns
ATTORNEY Patented May 3, 1949

2,469,026

UNITED STATES PATENT OFFICE 2,469,026

ARRANGEMENT FOR THE SALTING AND HOOKING OF FISH (HERRING)

Sverre A. Barstad, Stavanger, Norway

Application November 7, 1946, Serial No. 708,382
In Norway November 21, 1945

8 Claims. (Cl. 99—261)

The present invention relates to a method of and arrangement for automatic salting and hooking of fish, particularly sprats and herring, and the object is hereby to be able to carry out the complete curing of the fish, whether as salting, smoking or canning, in a single factory unit, in such a manner that all manual work connected with the process is dispensed with, or is at least limited to a minimum. The method consists mainly therein that fish of a certain size group are dropped into a salting vessel (brine vat), through which a salt solution is flowing rapidly towards the outlet, in such a way that the fish are carried from the vessel (vat) to an overflow, the fish thereby being caused to emerge heads first with the current on account of tubing with inclined apertures mounted in the vessel (vat), and at the overflow being carried into forms located at this place from which they are extracted by hooks on the conveyors that are carrying the fish through the smoking plant. The batch of fish is suitably conducted through a sorting drum for the smallest fish size, for the removal of this. The rest then being conducted through the next sorting drum for the removal of fish size No. 2, etc., etc., while the fish that are larger than the highest number come out through the last drum and are removed.

When putting this process into operation, under each sorting drum except the first one is suitably located a drop chute which brings the fish to the section of the salting vat where it belongs.

This may have sections of different lengths all depending upon the size of the fish, the larger the fish the longer the section or compartment, the brine being kept in circulation from that end of each compartment where the fish drop from its corresponding sorting drum towards the opposite end where the overflow with the forms are located, the latter having their entrance openings for the fish at the top.

For each compartment of the salting vat are below water level arranged parallel tubes, spaced according to the fish size belonging to the compartment, and these tubes are furnished with forwards slanting holes to which circulating brine is supplied, so that this flows with a whirling motion towards the overflow, which has been proved sufficient to cause the fish to flow between the tubes, heads foremost. The fish dropping from the sorting drum will either cling to the tubes for a short time or fall into the brine. It's sufficient to arrange one layer of tubes, and the fish which floats to the surface, especially in salt water which causes greater buoyancy than fresh water, will pass between the tubes in rapid motion on account of the jets which are shot from the slanting holes of the tubes. The brine in these is formed out by a pump thus becoming a whirling flow, and nearly always the fish will then turn over so that heads will be in front before the overflow is reached. Each of the before mentioned forms is furnished with an outwardly and laterally deflectable flap on the side remote from the overflow, and has in its inner part an open slot permitting passage of the conveyer hooks, said hooks catching the fish in the forms and pulling them through and out of the forms, the flap swinging first outwards and then closing.

The conveyors are carried, suitably with zigzag course, upward through a smoking tower, then downward through another smoking tower, from this through a cooling apparatus, and finally through a cutting or shearing machine where the bodies of the fish are separated from the heads remaining on the conveyor hooks. In front of the first sorting drum a washing drum may be arranged in which the fish are washed, and from this an elevator carries the fish to the aforementioned sorting drum.

A design showing essential parts of the afore mentioned plant for the smoking of the fish is shown diagrammatically in the accompanying drawings. Fig. 1 is a vertical view, partly sectional, of that part of the plant where the fish are washed, sorted out, carried into the forms and smoked. Fig. 2 shows in plan the sorting arrangement and the brine vats. Fig. 3 shows in a larger scale and in section a form. Fig. 4 shows in larger scale part of a longitudinal section through the tubes in the brine vats.

As shown in Fig. 1 the fish are dumped into a hopper 1, which leads to a washing drum 2 where the fish are washed during their passage through the drum, being then picked up by a conveyor 3 the washing water running down into a lower container 4. The conveyor 3 feeds the fish upward to a row of sorting drums. The fish mass as a whole is first carried to a pre-sorting drum 5a where undersized fish drops out and through a drop chute is removed from the plant.

The fish passing through the drum 5a are through a tube or similar device 7a transferred to the next sorting drum 5b which lets through fish of the smallest size group No. 1. These fish drop into a chute 6b. The fish coming through the drum 5b are carried through a tube 7b to the next sorting drum 5c, from which the second size group drops through a drop chute 6c. The fish coming from drum 5c are carried through the tube 7c to the next sorting drum 5d. The sorting out in the last sorting drum 5d with drop chute 6d is carried out correspondingly. What is not passing through the sorting drum 5d—or the fish of largest sizes—is removed from this drum and is carried away for other purposes, eventually into a suitably arranged pre-salting vat for larger fish, for instance larger herrings. Simultaneously with the sorting out in drums 5b, 5c, 5d they are exposed to spraying with strong salt solutions through perforated tubing 8a, 8b, and 8c, which have connection with the circulating brine through the joint tube 9 for all the three last named drums. The brine is brought into circulation in a suitable manner, for instance with a pump 10, and flows together with the fish through the drums and through the drop chutes 6b, 6c, 6d to the corresponding brine vats 11b, 11c, and 11d. These are best seen in Fig. 2, and have a somewhat different length because the largest fish in vat 11d requires the longest treatment. This is the reason for giving the brine vats different lengths as mentioned. In Fig. 2 the difference in length is comparatively small, but in practice it will usually be a trifle larger, depending upon one's experience and the time one finds necessary for the fish to stay in the strong brine in order to become suitably salted.

Naturally this also depends upon the circulation speed of the brine. Each brine vat is at the left side in Fig. 2 furnished with an overflow as indicated by 12 in Fig. 1 for brine vat 11b. Corresponding overflows are arranged for all brine vats. In these vats parallel circulation tubes 13 are placed which are indicated in Fig. 2 for brine vat 11d only, and which are furthermore shown in larger scale on Fig. 4. These tubes are arranged in a single layer in the flat brine vats, half way sunk below the surface of the brine, and are as shown at 14 in Fig. 4 furnished with slanting holes which are placed in such a way that they just correspond with the surface of the brine. The holes which correspond with the brine surface have a slanting forward direction, and when therefore the brine from the right is being pumped through the tubes 13 towards the left, a great number of forwards slanting energetic brine jets will be directed along the surface of the brine. The jets will push the fish along and cause the brine surface in the vats to adopt a whirling forward motion, although with a decided direction towards the left. As previously mentioned, experience shows that fish under such circumstances during their motion from drop chute and forward to the overflow 12 sooner or later will turn over so that the heads are pointing at the overflow. From this the brine returns through tubes or conduits 15 and 16 to the pump 10.

At the outside of all overflows are mounted forms 17 which point downwards with openings in the opposite direction, and which are calculated to receive the fish reaching the overflow which otherwise would drop into the conduit 15.

The forms have the same size as the group of fish or sorting group they belong to. The fish therefore will hit the forms 17 and fall into these, as indicated in Fig. 3. These forms are divided in two parts, one rigidly mounted rear part 17a and a forward part 17b outwardly deflectable at 17c. Through the lower section of both form-parts 17a and 17b is arranged a slot 18, resp. 19, which has the same direction as the brine flow, the forms being designed in such a way that the fish without fail will drop into these with the dorsal and pectoral fins at right angles to the direction of the brine flow. The eyes therefore will come nearest the form-parts 17a and 17b as shown in Fig. 3. The deflectable part of the form 17b is by the help of a spring 17d held in a closed position, but can be deflected outwards, the fish being pulled out of the forms with a hook 20. This hook is attached to a conveyor 21, which in the drawing is shown only diagrammatically, and which steadily moves forward in the direction of the arrow 22. The conveyor 21 has a great number of such hooks 20, suitably spaced, so that the hook during its motion in the direction of the arrow 22 will pass through the slots 18 and 19 of the form, and then hit the fish eyes, thus securing a firm grip on the fish. In Fig. 3 the hook is shown with a somewhat shorter length than what is needed for actual operation. During the motion of the hook 20 it will thus catch hold of the fish, pulling them to the left in Fig. 3.

The flap 17b then swinging out to the position shown by the dotted lines, so that the fish are pulled completely out of the forms, and then conveyed into the smoking plant R, which is indicated in Fig. 1, and where the chain 21 runs zigzag over rollers 23,—firstly upwards in a smoking space 24 and then downwards into another space K—both these smoking spaces having smoke circulated through them in the usual way. Also horizontal smoke furnaces may be utilized. Then the chain runs through a cooling device which is diagrammatically indicated at K, continues to a cutting apparatus to the left of K (not shown) where the body proper of the fish is sheared off, so that the head is left hanging on the hooks 20. From there the chain runs on to different devices which remove the heads from the hooks, the chain is then cleaned and again reaches form 17.

The hooks 20 must during operation, especially through the smoking plant, hang straight down from the chain. In Fig. 3 they are in spite of this shown turned upwards. Before reaching the form 17, the hooks on the chain pass through a small apparatus which is not shown in the drawing, and which is furnished with slanting surfaces and automatically swings the hooks upwards to the position required when said hooks are being passed into and through the form.

Of the chains before mentioned there are arranged as many side by side as there are forms 17 in the entire plant, and all chains move along parallel paths.

The conveyor for each chain group can be controlled in such a manner, that larger fish are held for a longer period in the smoking space than smaller fish.

I claim:

1. In an apparatus for salting and hooking herrings to be smoked, the combination with a brine vessel of means for circulating the brine rapidly in a direction to an overflow for the brine, parallel tubes arranged immersed in the vessel, apertures in the tubes directed obliquely towards the overflow, means for circulating the brine through said tubes and through their apertures out into the vessel, whereby herrings dropped in uncontrolled positions into the vessel remote from the overflow are automatically caused to move towards same, head foremost, forms arranged outside the overflow to receive the herrings passing over same, moving hooks adapted to catch the herrings moved into the forms, conveyors carrying the hooks and moving them to pull the herrings out from the forms, and a smoking section, through which the conveyors with hooks and herrings hanging on same are moved for becoming smoked.

2. In an apparatus as set forth in claim 1, a sorting drum to be supplied with herrings and adapted to sort out herrings having a certain minimal size and to drop same into the brine vessel and remote from the overflow.

3. In combination with a plurality of apparatus as set forth in claim 1, a sorting drum for each apparatus and adapted, when supplied with herrings, to sort out herrings having a certain minimal size and to drop same into the corresponding vessel end remote from the overflow, the several sorting drums being connected in series and adapted to sort out different, gradually increasing sizes of herrings from a stream of herrings passed to the first drum sorting out the least size (No. 1), then passed to the next drum sorting out the next size (No. 2), and so on to the last drum sorting out the biggest size, whereas herrings bigger than this size are passing out and are removed.

4. In combination with a plurality of apparatus as set forth in claim 1, a sorting drum for each apparatus and adapted, when supplied with herrings, to sort out herrings having a certain minimal size and to drop same into the corresponding vessel end remote from the overflow, the several sorting drums being connected in series and adapted to sort out different, gradually increasing sizes of herrings from a stream of herrings passed to the first drum sorting out the least size (No. 1), then passed to the next drum sorting out the next size (No. 2) and so on to the last drum sorting out the biggest size, whereas herrings bigger than this size are passing out and are removed, the brine vessels being of different lengths, being the longer the bigger the size is of herrings dropped into them from the corresponding drum.

5. In combination with a plurality of apparatus as set forth in claim 1, a sorting drum for each apparatus and adapted, when supplied with herrings, to sort out herrings having a certain minimal size and to drop same into the corresponding vessel end remote from the overflow, the several sorting drums being connected in series and adapted to sort out different, gradually increasing sizes of herrings from a stream of herrings passed to the first drum sorting out the least size (No. 1), then passed to the next drum sorting out the next size (No. 2) and so on to the last drum sorting out the biggest size, whereas herrings bigger than this size are passing out and are removed, each of the brine vessels having forms of a size suitable for the herring size received.

6. In combination with a plurality of apparatus as set forth in claim 1, a sorting drum for each apparatus and adapted, when supplied with herrings, to sort out herrings having a certain minimal size and to drop same into the corresponding vessel end remote from the overflow, the several sorting drums being connected in series and adapted to sort out different, gradually increasing sizes of herrings from a stream of herrings passed to the first drum sorting out the least size (No. 1), then passed to the next drum sorting out the next size (No. 2) and so on to the last drum, sorting out the biggest size, whereas herrings bigger than this size are passing out and are removed, the brine vessels being of different lengths, being the longer the bigger the size is of herrings dropped into them from the corresponding drum, and each of the brine vessels having forms of a size suitable for the herring size received.

7. In an apparatus for salting and hooking herrings to be smoked, the combination with a brine vessel of means for circulating the brine rapidly in direction to an overflow for the brine parallel tubes arranged immersed in the vessel, apertures in the tubes directed obliquely towards the overflow, means for circulating the brine through said tubes and through their apertures out into the vessel, whereby herrings dropped in uncontrolled positions into the vessel remote from the overflow are automatically caused to move towards same, head foremost, forms arranged outside the overflow to receive the herrings passing over same, moving hooks adapted to catch the herrings moved into the forms, conveyers carrying the hooks and moving them to pull the herrings out from the forms, and a smoking section, through which the conveyers with hooks and herrings hanging on same are moved for becoming smoked, each form having at the side remote from the overflow a laterally and outwardly deflectable flap and being formed in its lower part with an open slot, adapted to allow passage of the conveyor hooks, simultaneously with the same catching the fish standing in the forms and moving the same through and out of the latter, the flap thereby swinging first outward and thereupon returning to closing position.

8. In combination with a plurality of apparatus as set forth in claim 1, a sorting drum for each apparatus and adapted, when supplied with herrings, to sort out herrings having a certain minimal size and to drop same into the corresponding vessel end remote from the overflow, the several sorting drums being connected in series and adapted to sort out different, gradually increasing sizes of herrings from a stream of herrings passed to the first drum sorting out the least size (No. 1), then passed to the next drum sorting out the next size (No. 2) and so on to the last drum, sorting out the biggest size, whereas herrings bigger than this size are passing out and are removed, in front of the first sorting drum a washing being arranged, in which the herrings are washed, and a lifting device passing the washed herrings to the first sorting drum.

SVERRE A. BARSTAD.

REFERENCES CITED

The following references are of record in the file of this patent:

UNITED STATES PATENTS

| Number | Name | Date |
| --- | --- | --- |
| 1,229,472 | Julien | June 12, 1917 |
| 1,485,823 | Barry | Mar. 4, 1924 |
| 2,051,676 | Bledorn | Aug. 18, 1936 |

OTHER REFERENCES

"Marine Products of Commerce," by D. K. Tressler, published by The Chemical Catalog Co. Inc., N. Y., pages 353–357. (Copy in Div. 63.)